US007880360B2

(12) United States Patent
Yamawaki et al.

(10) Patent No.: US 7,880,360 B2
(45) Date of Patent: Feb. 1, 2011

(54) STATOR ASSEMBLY

(75) Inventors: Takayuki Yamawaki, Kitasaku-gun (JP); Yuzuru Suzuki, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 185 days.

(21) Appl. No.: 12/320,412

(22) Filed: Jan. 26, 2009

(65) Prior Publication Data
US 2009/0267442 A1 Oct. 29, 2009

(30) Foreign Application Priority Data
Apr. 28, 2008 (JP) .............................. 2008-117675

(51) Int. Cl.
H02K 3/34 (2006.01)
H02K 1/14 (2006.01)
(52) U.S. Cl. ...................................... 310/215; 310/194
(58) Field of Classification Search ................ 310/194, 310/214–215
See application file for complete search history.

(56) References Cited
U.S. PATENT DOCUMENTS
6,127,753 A * 10/2000 Yamazaki et al. ............. 310/71
6,670,736 B2 * 12/2003 Horng et al. ................. 310/194
7,595,572 B2 * 9/2009 Haga et al. .................... 310/71

FOREIGN PATENT DOCUMENTS
| JP | 11-206057 | * | 7/1999 |
| JP | 2002-044894 | * | 2/2002 |
| JP | A-2003-23743 | | 1/2003 |
| JP | A-2006-129590 | | 5/2006 |
| JP | 2008-43139 | * | 2/2008 |

* cited by examiner

Primary Examiner—Burton Mullins
(74) Attorney, Agent, or Firm—Oliff & Berridge, PLC

(57) ABSTRACT

A stator assembly is provided and includes a laminated core and a one-part insulator having cover walls for covering edges of the laminated core, wherein first projections and a second projection both having a height smaller than the difference between the height of the cover walls and the thickness of the laminated core are formed on one side surface of the insulator in such a manner as to make contact with a part of one axial end side surface of the laminated core, whereby a gap which corresponds to the projection distance of the first and second projections and which serves as a clearance space for chips scraped by the edges of the laminated core from the surfaces of the cover walls is provided between the insulator and the laminated core, resulting in ensuring that the insulator is snap-fitted on the laminated core in good shape.

3 Claims, 3 Drawing Sheets

STATOR ASSEMBLY

BACKGROUND OF THE INVENTION

1. Field of the Invention

The present invention relates to a stator assembly of a motor.

2. Description of the Related Art

Conventionally, a laminated core, which is composed of a plurality of silicon steel sheet pieces punched out in a predetermined shape and stacked in layers, is widely used in a stator assembly for a motor. An electrical insulation coating is previously applied to the surface of a material sheet of which the silicon steel sheet pieces to constitute the laminated core are punched out, but since no such coating is provided on the cut surface of the silicon steel sheet pieces or the insulation coating previously applied is removed at the edge portion thereof, the laminated core generally is covered with an insulator made of an insulating material such as synthetic resin thereby covering the edge portion of the laminated core (refer to, for example, Japanese Patent Application Laid-Open No. 2006-129590 ([0029], FIG. 3)).

In the stator assembly structured as described above, since the insulator is of a two-part structure divided into two segments and is attached onto the laminated core such that one segment is fitted from one axial end side of the laminated core and the other segment is fitted from the other axial end side thereof so as to axially sandwich the laminated core, the axial dimension of the stator assembly increases by the aggregate thickness of the two segments of the insulator. Also, the two-part insulator hampers cost reduction.

In order to overcome the problems described above, a stator assembly is disclosed which includes a one-part insulator fitted onto a laminated core from only one axial end side of the laminated core (refer to, for example, Japanese Patent Application Laid-Open No. 2003-23743 ([0019], FIG. 1)).

In the case of the above-described one-part insulator fitted onto the laminated core from only one axial end side of the laminated core, one end of the insulator remains open, and therefore it is advisable that the insulator and the laminated core be so dimensioned as to provide a snap-fit condition therebetween for a secure attachment. This, however, results in that the surfaces of cover walls of the insulator are possibly scraped by the edges of salient poles of the laminated core when the insulator is snap-fitted onto the laminated core from the one axial end side of the laminated core, and thus the snap-fit condition of the insulator on the laminated core is deteriorated with scraped chips.

SUMMARY OF THE INVENTION

The present invention has been made in light of the above problems, and it is an object of the present invention to provide a stator assembly which includes a laminated core and a one-part insulator fitted onto the laminated core from only one axial end side of the laminated core, and in which the edge of the laminated core is surely covered, whereby the insulator is always allowed to be properly snap-fitted onto the laminated core while achieving reduction in motor size and cost.

In order to achieve the object described above, according to an aspect of the present invention, there is provided a stator assembly which includes: a laminated core including a plurality of salient poles; and an insulator attached on the laminated core from only one axial end side of the laminated core, wherein the insulator includes: a plate portion having an outer shape corresponding to the projected planar geometry of the laminated core; a plurality of cover walls for covering the salient poles of the laminated core, which have a height greater than the thickness of the laminated core and which are disposed on a side surface of the plate portion along the outer shape line of the plate portion; and at least one projection which has a height smaller than the difference between the height of the cover walls and the thickness of the laminated core, and which is disposed on the side surface of the plate portion having the cover walls and is located to make contact with a part of the surface of the one axial end side of the laminated core.

In the aspect of the present invention, the at least one projection may include a plurality of first projections each located to coincide with the radially outermost portion of each of the salient poles of the laminated core.

In the aspect of the present invention, the at least one projection may further include a second projection located around and along the circumference of a center opening which is disposed at the plate portion and which engages with a boss portion of a motor base member.

Thus, according to the present invention, a stator assembly is provided which includes a laminate core and a one-part insulator fitted on the laminated core from only one axial end side of the laminated core, and in which the edge of the laminated core is surely covered, whereby the insulator is always allowed to be properly snap-fitted onto the laminated core while achieving reduction in motor size and cost.

DETAILED DESCRIPTION OF THE INVENTION

An exemplary embodiment of the present invention will hereinafter be described with reference to the accompanying drawings.

Figure 1:
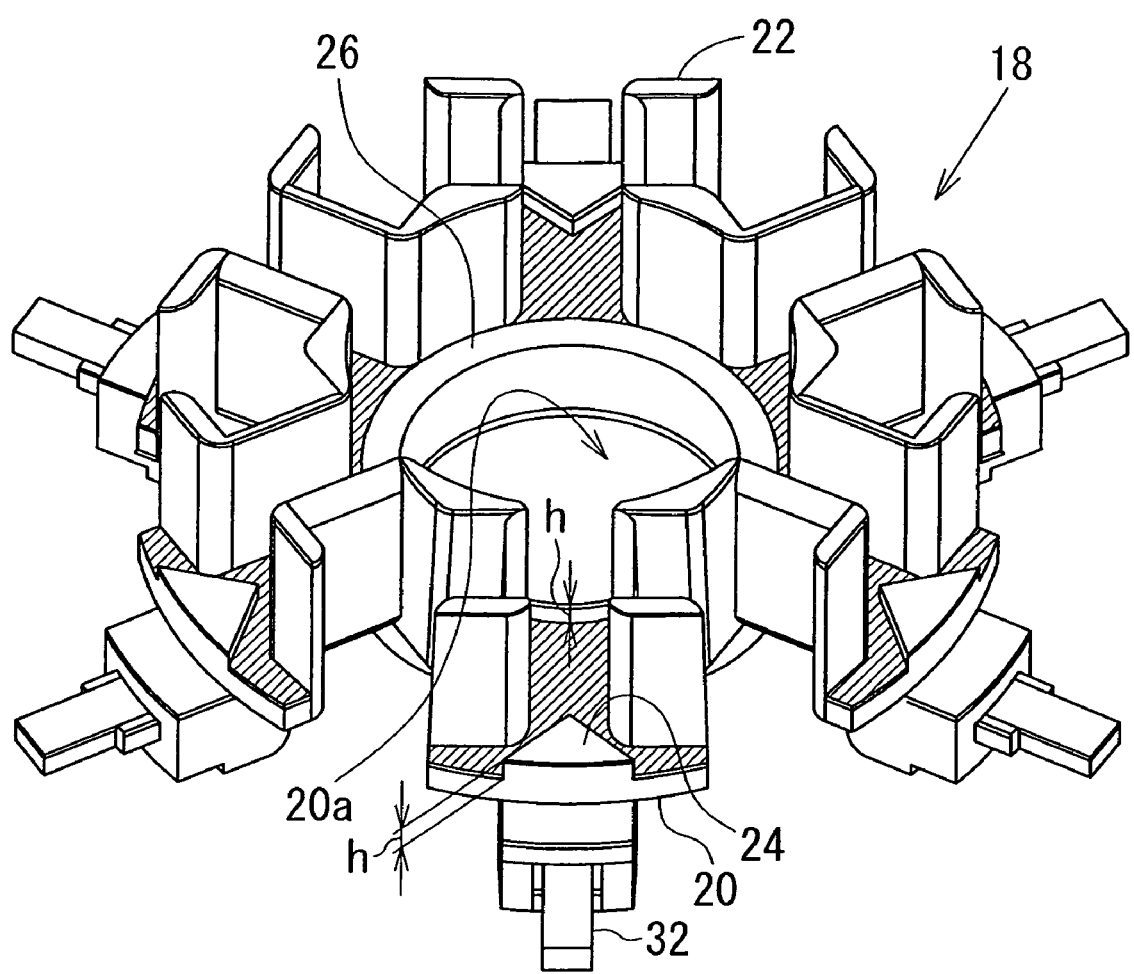
FIG. 1 is a perspective view of an insulator of a stator assembly according to an embodiment of the present invention.
Figure 2:
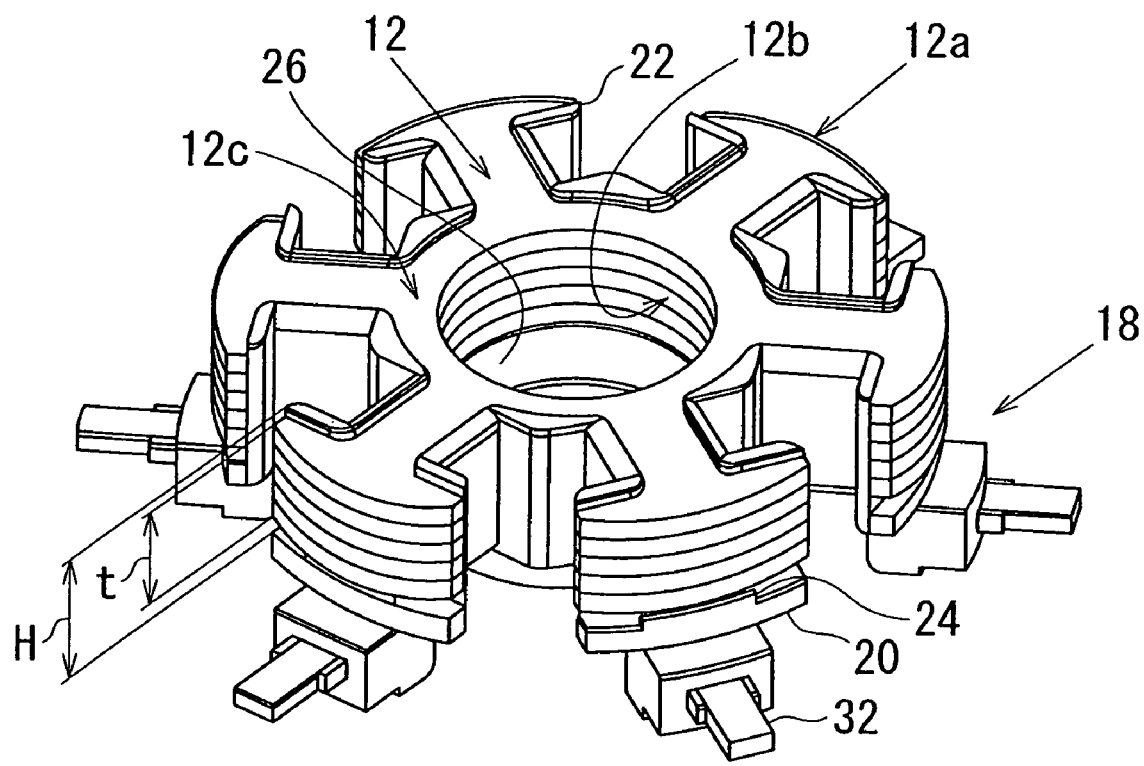
FIG. 2 is a perspective view of a laminated core of the stator assembly according to the embodiment of the present invention, wherein the insulator of FIG. 1 is fitted on the laminated core.
Figure 3:
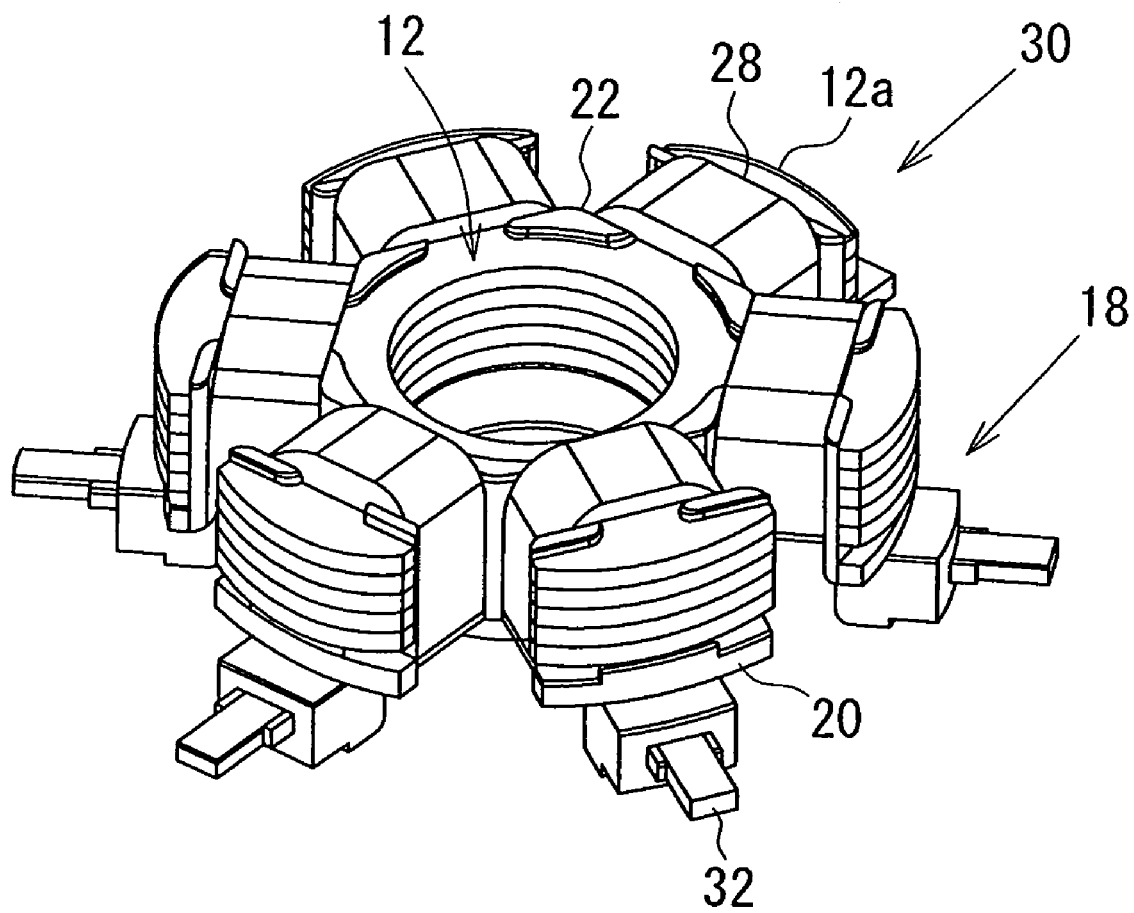
FIG. 3 is a perspective view of the stator assembly according to the embodiment of the present invention, complete with coils wound at salient poles of the laminated core and cover walls of the insulator.

Referring to FIGS. 1, 2 and 3, a stator assembly 30 (refer to FIG. 3) according to an embodiment of the present invention includes an insulator 18 of FIG. 1 and a laminated core 12 shown in FIG. 2, wherein the insulator 18 is fitted onto the laminated core 12 from only one axial end side of the laminated core 12 as shown in FIG. 2.

The insulator 18 is made of synthetic resin by injection molding and includes a plate portion 20 having an outer shape corresponding to the projected planar geometry of the laminated core 12. The laminated core 12 includes an annular portion 12c and a plurality (six in the figure) of salient poles 12a, and a plurality of cover walls 22 to cover the edges of the salient poles 12a are disposed upright on one side surface (top side surface shaded with hatching in FIG. 1; hereinafter referred to as "top surface" as appropriate) of the plate portion 20 along the outer shape line of the plate portion 20.

Referring to FIG. 2, the cover walls 22 have a height (H) greater than a thickness (t) of the laminated core 12. Referring to FIG. 1, first projections 24 and a second projection 26 both having a height (h) smaller than a difference (H−t) between the height (H) of the cover walls 22 and the thickness (t) of the laminated core 12 are integrally formed at the top surface (hatched area in FIG. 1) of the plate portion 20 on which the cover walls 22 are disposed.

In the example shown in FIG. 1, the first projections 24 have a substantially triangular pillar shape and are each located to make contact with the radially outermost portion of the salient pole 24*a*. The insulator 18 includes a center opening 20*a* (refer to FIG. 1) at the plate portion 20, and the laminated core 12 includes a center opening 12*b* (refer to FIG. 2), wherein a boss portion of a motor base member (not shown) engages into the center openings 20*a* and 12*b*. The second projection 26 is disposed around and along the circumference of the center opening 20*a* of the plate portion 20 so as to form a circular cylinder as shown in FIG. 1.

Referring to FIG. 3, the stator assembly 30 further includes a plurality of coils 28 wound at the salient poles 12*a* of the laminated core 12 and the cover walls 22 of the insulator 18 snap-fitted onto the laminated core 12 from only one axial end side of the laminated core 12 as shown in FIG. 2. Also included in the stator assembly 30 are terminal members 32 which are implanted at the insulator 18 and around which the wire ends of the coils 28 are wrapped.

With the structure described above according to the embodiment of the present invention, the following advantageous effects are achieved.

Firstly, since the first projections 24 and the second projection 26, which both have the height (h) smaller than the difference between the height (H) of the cover walls 22 and the thickness (t) of the laminated core 12, are formed at the top surface of the plate portion 20 so as to make contact with a part of one side surface (bottom side surface in the figure, that is the surface of the earlier mentioned one axial end side from which the insulator 18 is fitted; hereinafter referred to as "bottom surface" as appropriate) of the laminated core 12, when the insulator 18 is fitted on the laminated core 12 (see FIG. 2), a gap equal to the protrusion distance of the first and second protrusions 24 and 26 is provided between the top surface of the plate portion 20 of the insulator 18 and the bottom surface of the laminated core 12.

Under the circumstance described above, since the height (h), that is, the protrusion distance of the first and second projections 24 and 26 is set to be smaller than the difference between the height (H) of the cover walls 22 and the thickness (t) of the laminated core 12, the edges of the salient poles 12*a* of the laminated core 12 are prevented from axially sticking out from the cover walls 22 of the insulator 18, whereby the insulation properties required are ensured by the insulator 18.

Secondly, the gap provided between the top surface (hatched area in FIG. 1) of the plate portion 20 of the insulator 18 and the bottom surface of the laminated core 12 serves as a clearance space for scrapings which are taken from the surfaces of the cover walls 22 of the insulator 18 by the edges of the salient poles 12*a* of the laminated core 12 when the insulator 18 is fitted onto the laminated core 12.

Consequently, the snap-fit condition of the insulator 18 onto the laminated core 12 is always put in good shape as specified without suffering deterioration due to the scraped chips. Thus, when the insulator 18 is fitted onto the laminated core 12 from only one axial end side of the laminated core 12, the edge portions of the salient poles 12*a* of the laminated core 12 are duly covered with the cover walls 22 of the insulator 18 and surely insulated.

Furthermore, the design is based on the assumption that the surfaces of the cover walls 22 of the insulator 18 will be scraped by the edges of the salient poles 12*a* of the laminated core 12, and therefore special fitting tools are not required.

When the insulator 18 is fitted onto the laminated core 12 from only one axial end side of the laminated core 12, the other axial end side of the laminated core 12 is left exposed, but the laminated core 12 has an electrical insulation coating remaining intact at the exposed portion thus securing insulation properties, while the edges of the salient poles 12*a* of the laminated cores 12, at which the insulation coating is scraped at the time of snap-fitting, are covered up with the cover walls 22, whereby insulation properties required are secured as a whole.

Thus, a two-part insulator composed of two segments is not required which is fitted onto the laminated core 12 with the two segments fitted respectively from the both axial end sides of the laminated core 12 so as to axially sandwich the laminated core 12.

Also, the first projections 24 formed at the plate portion 20 of the insulator 18 are each located so as to make contact with the radially outermost portion of the each of the salient poles 12*a* of the laminated core 12, and therefore, when the insulator 18 is fitted onto the laminated core 12 from one axially end side of the laminated core 12, the plate portion 20 of the insulator 18 is surely brought into a tight contact, via the first projections 24, with the radially outermost portions of the salient poles 12*a* of the laminated core 12, whereby it is ensured that the snap-fitting condition between the insulator 18 and the laminated core 20 can always be put in good shape as specified.

Moreover, when the stator assembly 30 (FIG. 3) set up as described above is attached to the boss portion of a motor base member (not shown), a pressing force is applied to the radially outermost portions of the salient poles 12*a* of the laminated core 12, wherein the pressing force applied is transmitted to the plate portion 20 of the insulator 18 by way of each of the first projections 24 thereby allowing the stator assembly 30 to be securely attached with respect to the boss portion of the motor base member (not shown).

Further, the plate portion 20 of the insulator 18 is provided with the center opening 20*a* adapted to engage with the boss portion of the motor base member wherein the second projection 26 is formed around and along the circumference of the center opening 20*a* so as to form a circular cylinder, and therefore, when the insulator 18 is fitted onto the laminated core 12 from one axial end side of the laminated core 12, the laminated core 12 is securely brought into a tight contact, via the second projection 26, with the plate portion 20 of the insulator 18, whereby it is ensured that the snap-fitting condition between the insulator 18 and the laminated core 20 can always be put in good shape as specified.

Also, when the stator assembly 30 (FIG. 3) thus set up is attached to the boss portion of the motor base member (not shown), a pressing force is applied to the annular portion 12*c* of the laminated core 12, wherein the pressing force applied is transmitted to the plate portion 20 of the insulator 18 by way of the second projection 26 thereby allowing the stator assembly 30 to be securely attached with respect to the boss portion of the motor base member (not shown).

Thus, since the plate portion 20 of the insulator 18 is provided with the first projections 24 each located to make contact with the radially outermost portion of the salient pole 20*a* of the laminated core 20 and also with the second projection 26 located to make contact with the annular portion 12*c* (radially innermost portion) of the laminated core 20, when the insulator 18 is fitted onto the laminated core 12 from one axially end side of the laminated core 12, the laminated core 12 is further securely brought into a tight contact, via the first and second projections 24 and 26, with the plate portion 20 of the insulator 18, whereby it is further ensured that the snap-fitting condition between the insulator 18 and the laminated core 20 can always be put in good shape as specified.

And, when the stator assembly 30 is attached to the boss portion of the motor base member, a pressing force is applied to both the radially outermost portions of the salient poles 12a and the annular portion 21c of the laminated core 12, wherein the pressing force applied is transmitted to the plate portion 20 of the insulator 18 by way of the first and second projections 24 and 26 thereby allowing the stator assembly 30 to be further securely attached with respect to the boss portion of the motor base member.

In this connection, the first projections 24 of the insulator 18 are of the same height as the second projection 26 and have, for example, a triangular pillar shape in the example shown in FIG. 1, and pressure interaction between the laminated core 12 and the insulator 18 is surely borne by the top surface of the triangular pillar of the projections 24. Also, a molten material for injection molding the insulator 18 becomes readily flowable due to the first projections 24 having a triangular pillar shape as shown in the figure. The first projections 24 may alternatively have any polygonal pillar shape or a circular pillar shape, wherein the effects described above can be equally achieved. And, the insulator 18 described in the above embodiment is provided with both the first and second projections, but the present invention is not limited to such an insulator structure, and the insulator 18 may be structured to include either the first projections 24 or the second projection 26.

While the present invention has been illustrated and explained with respect to a specific exemplar thereof, the exemplar is not intended to limit the technical scope of the present invention, and variations in which parts of constituent members in the exemplar are substituted or eliminated or in which additional constituent members are provided may be included in the technical scope of the present invention.

What is claimed is:

1. A stator assembly comprising:
   a laminated core comprising a plurality of salient poles; and
   an insulator attached on the laminated core from only one axial end side of the laminated core, the insulator comprising:
      a plate portion having an outer shape corresponding to a projected planar geometry of the laminated core;
      a plurality of cover walls for covering the salient poles of the laminated core, the cover walls having a height greater than a thickness of the laminated core and disposed on a side surface of the plate portion along an outer shape line of the plate portion; and
      at least one projection which has a height smaller than a difference between the height of the cover walls and the thickness of the laminated core, and which is disposed on the side surface of the plate portion having the cover walls and is located to make contact with a part of a surface of the one axial end side of the laminated core.

2. A stator assembly according to claim 1, wherein the at least one projection comprises a plurality of first projections each located to coincide with a radially outermost portion of each of the salient poles of the laminated core.

3. A stator assembly according to claim 2, wherein the at least one projection further comprises a second projection located around and along a circumference of a center opening which is disposed at the plate portion and which engages with a boss portion of a motor base member.

* * * * *